July 9, 1929.　　　　G. W. SWIFT. JR　　　　1,719,947
MACHINE FOR MAKING FILLER FLATS FOR PACKING CASES
Filed Jan. 31, 1928　　　9 Sheets-Sheet 1

WITNESS

INVENTOR
GEORGE W. SWIFT, JR.
BY
ATTORNEYS

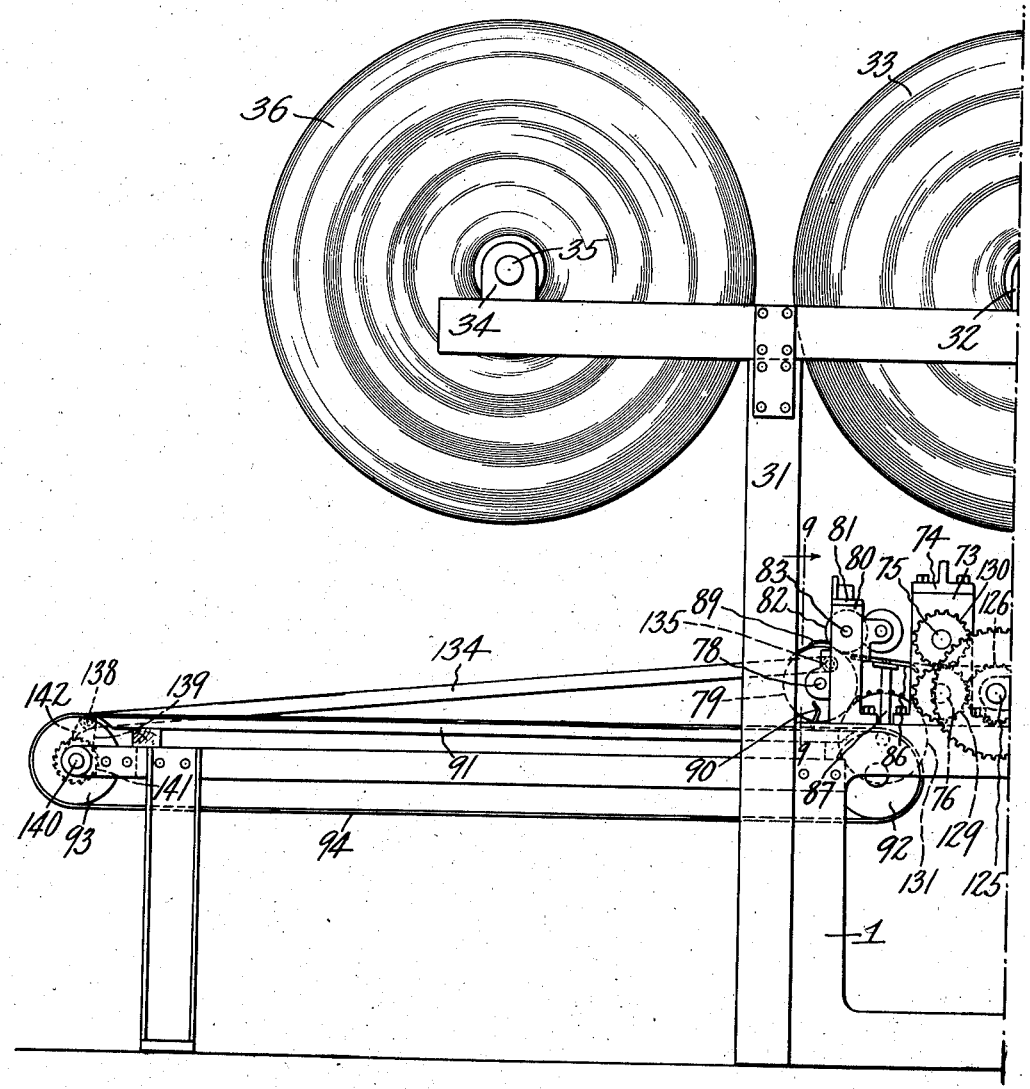

July 9, 1929.  G. W. SWIFT. JR  1,719,947
MACHINE FOR MAKING FILLER FLATS FOR PACKING CASES
Filed Jan. 31, 1928  9 Sheets-Sheet 3
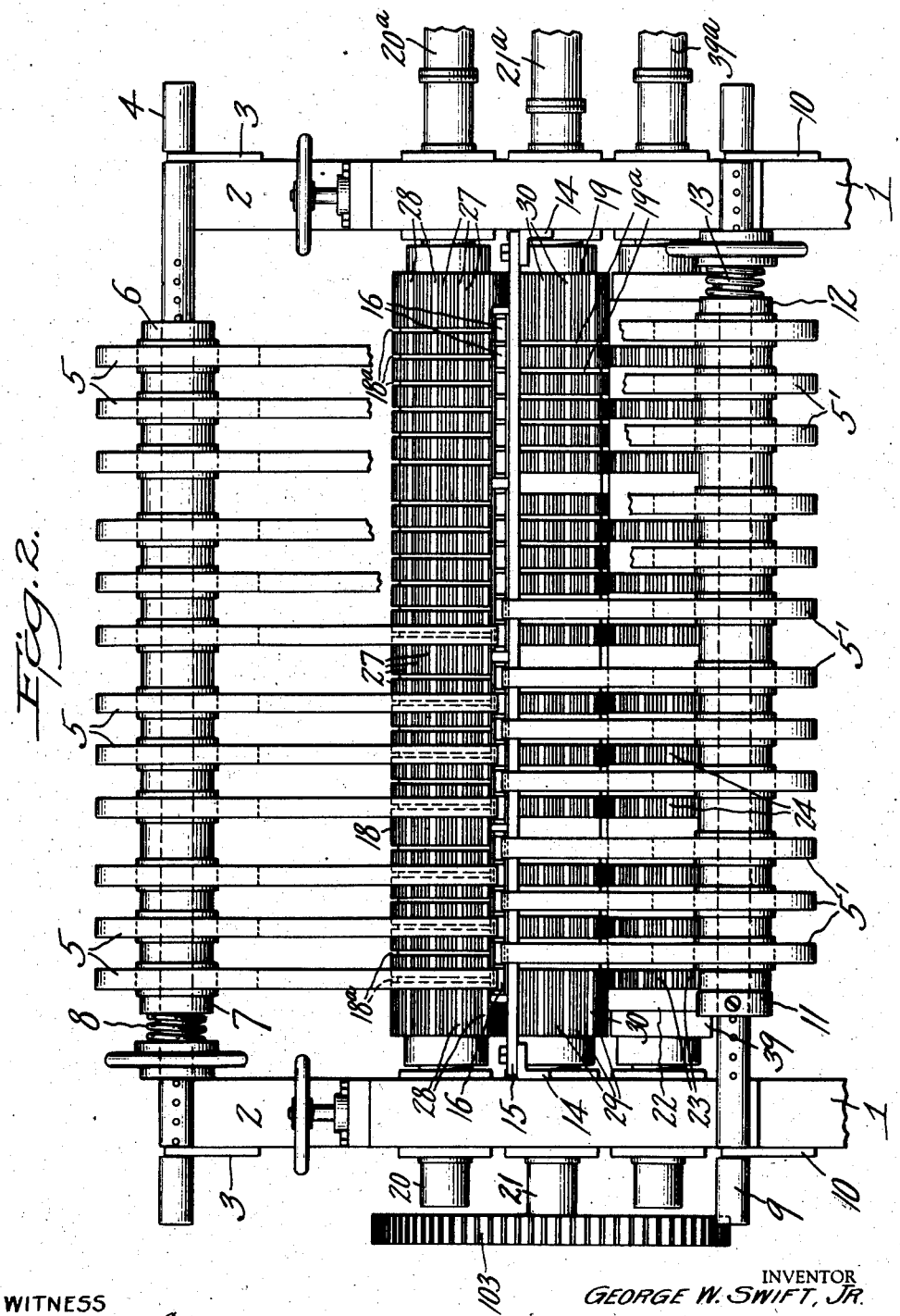
WITNESS
INVENTOR
GEORGE W. SWIFT, JR.
BY
ATTORNEYS July 9, 1929.  G. W. SWIFT. JR  1,719,947
MACHINE FOR MAKING FILLER FLATS FOR PACKING CASES
Filed Jan. 31, 1928  9 Sheets-Sheet 4
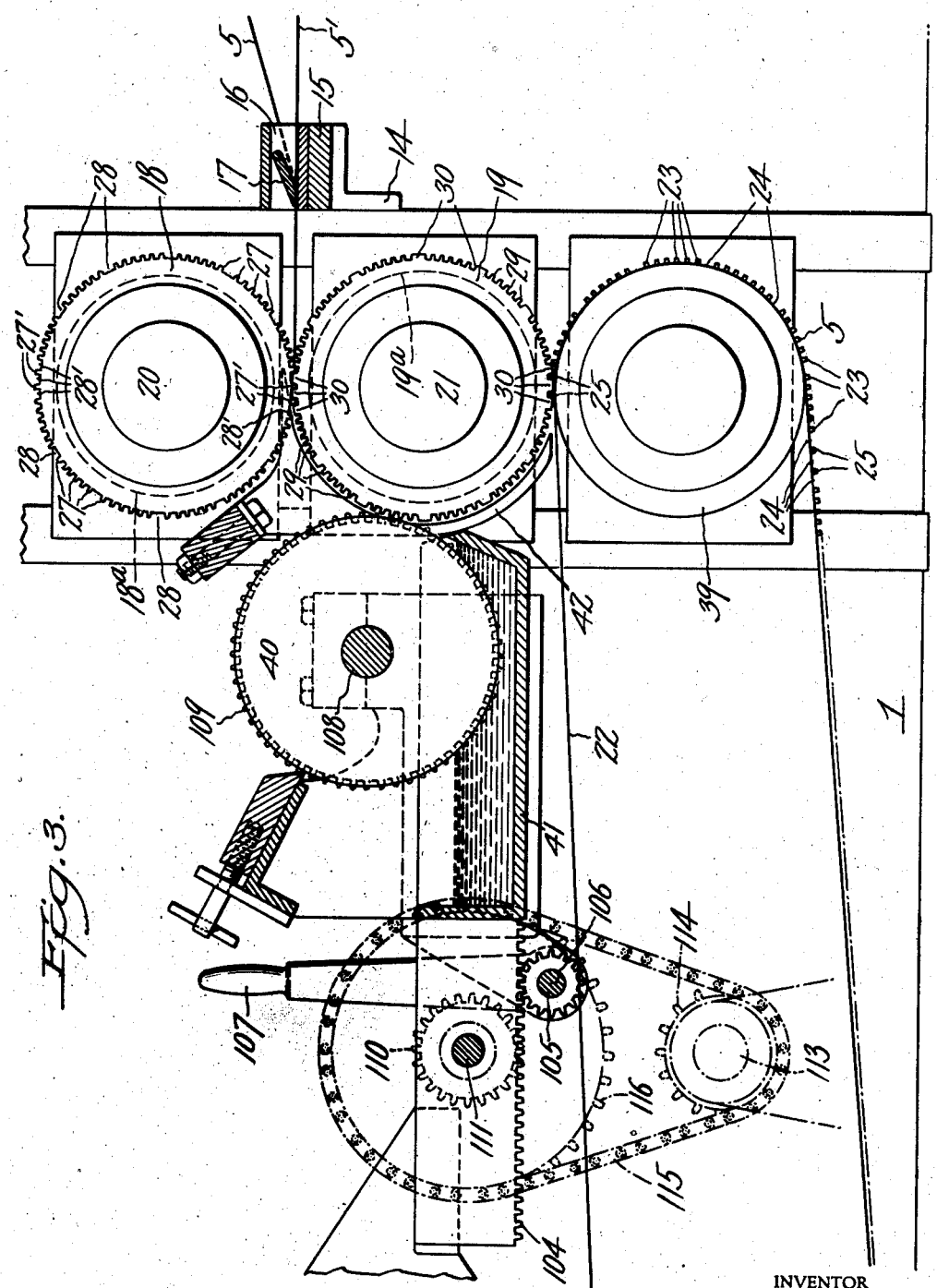
WITNESS
INVENTOR
GEORGE W. SWIFT, JR.
BY
ATTORNEYS

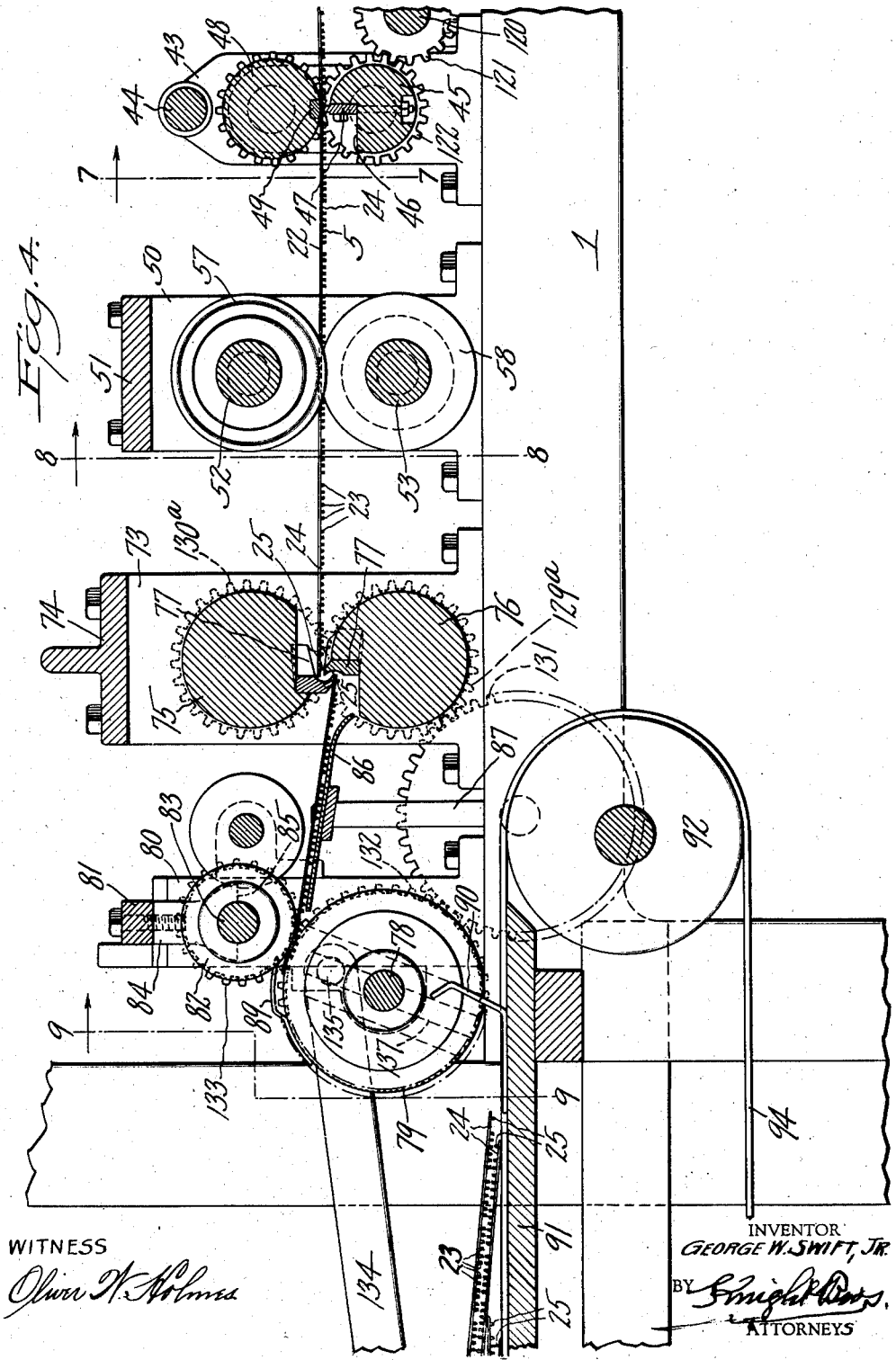

July 9, 1929.  G. W. SWIFT. JR  1,719,947
MACHINE FOR MAKING FILLER FLATS FOR PACKING CASES
Filed Jan. 31, 1928   9 Sheets-Sheet 6
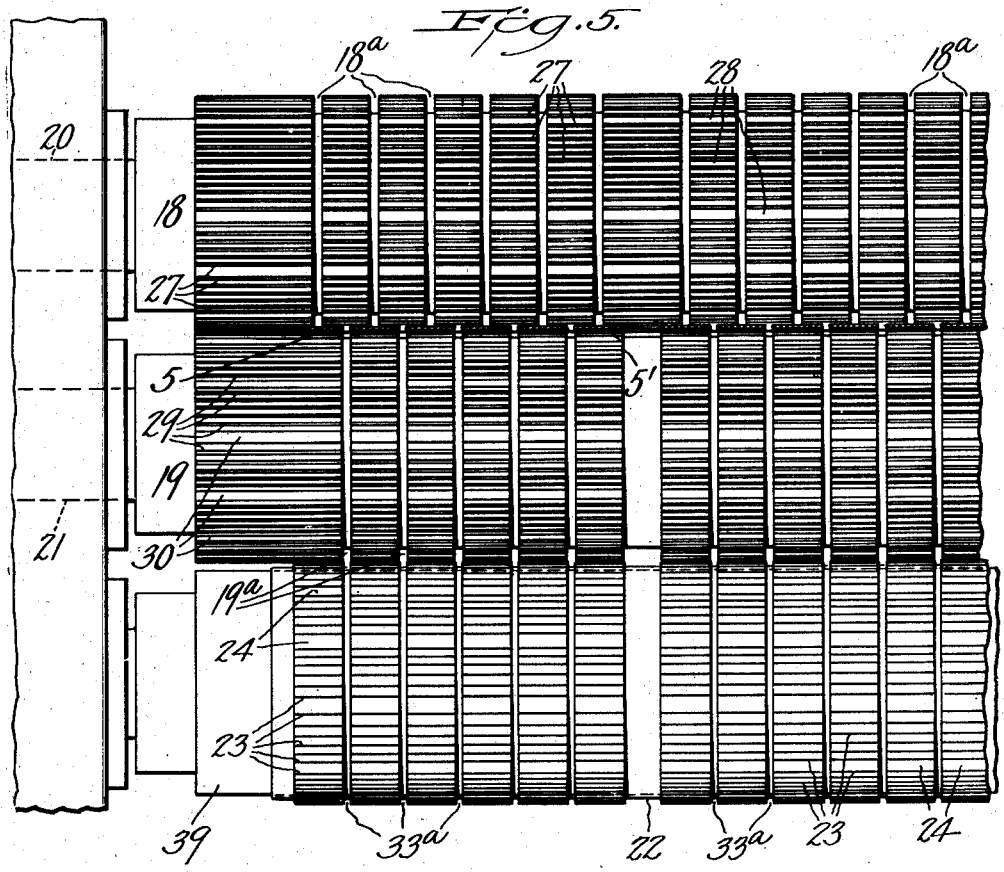
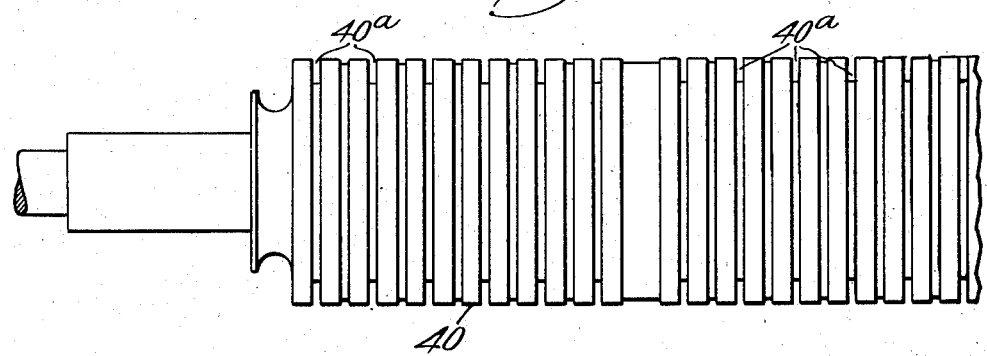
WITNESS
INVENTOR
GEORGE W. SWIFT, JR.
BY
ATTORNEYS

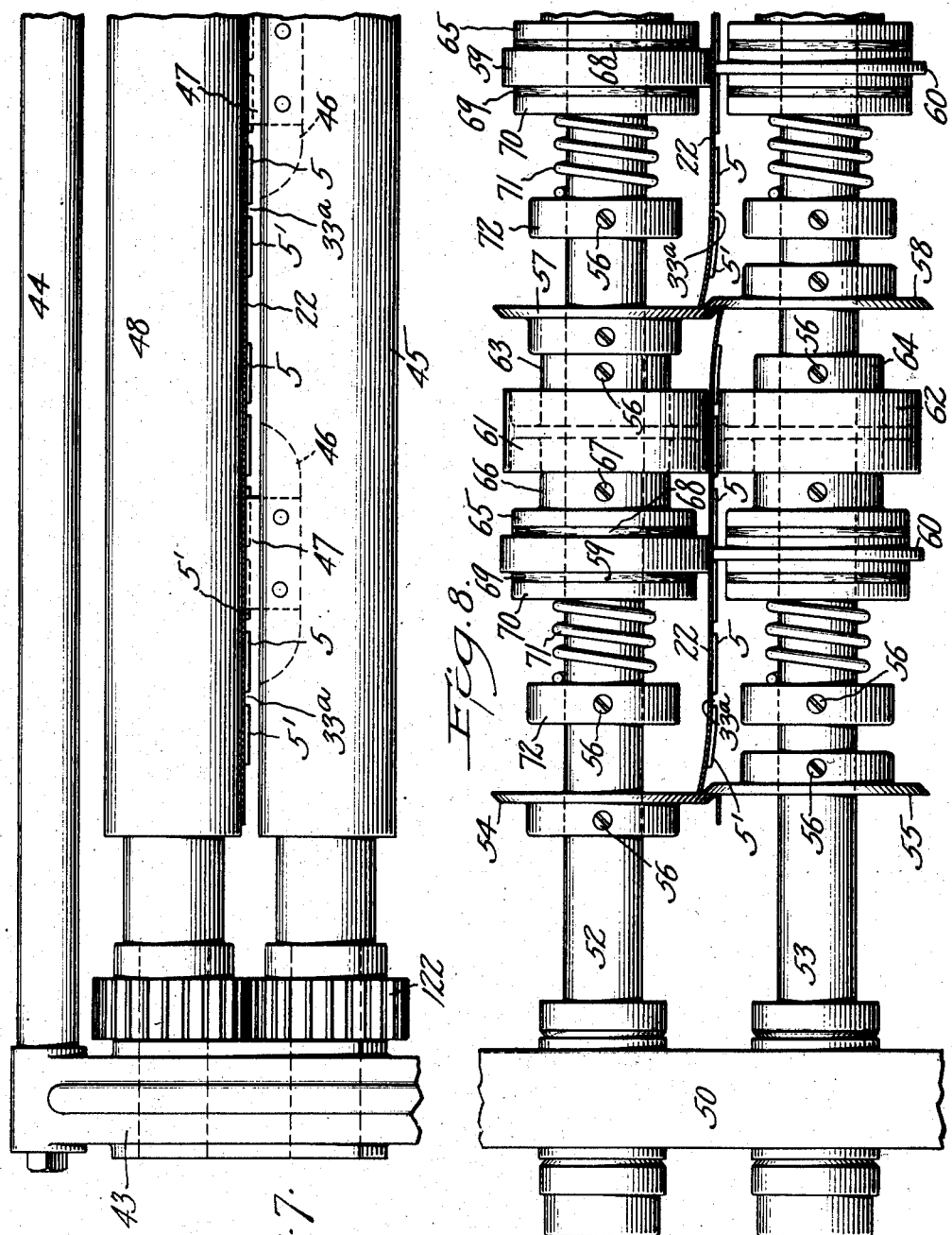

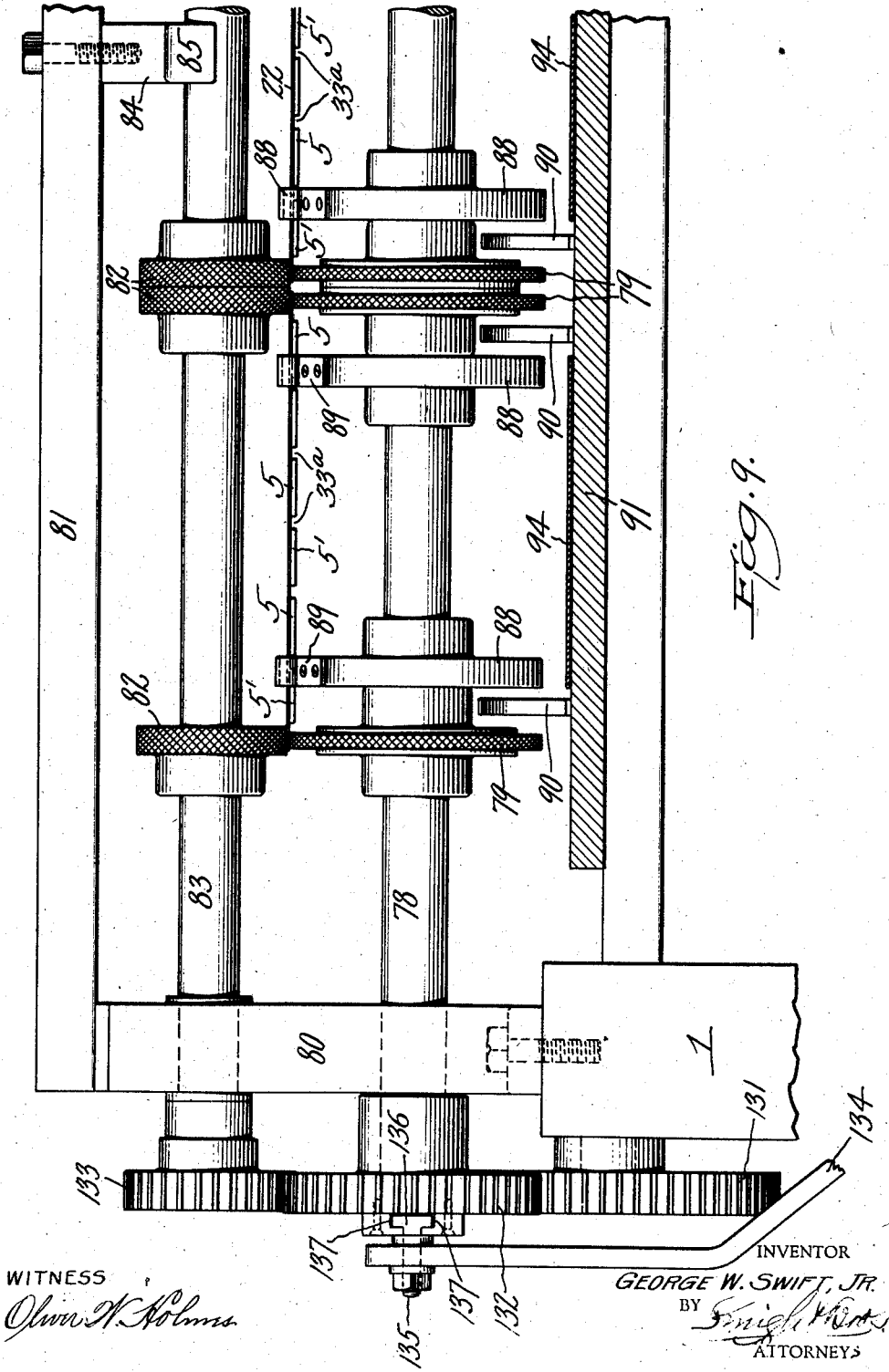

Patented July 9, 1929.

1,719,947

UNITED STATES PATENT OFFICE.

GEORGE W. SWIFT, JR., OF BORDENTOWN, NEW JERSEY.

MACHINE FOR MAKING FILLER FLATS FOR PACKING CASES.

Application filed January 31, 1928. Serial No. 250,786.

This invention relates to machines for making filler flats for packing cases and has for its object to provide an improved process and machine for manufacturing articles of this nature at high speed and in large quantities.

One of the objects of the present invention is to provide mechanism of improved construction whereby a plurality or ribbons may be separately provided with corrugations and subsequently attached to a common base-web whereon they constitute parallel laterally-spaced series of corrugations arranged in longitudinal groups.

Another object of my invention is to provide a suitable machine for rapidly and effectively building up a composite structure of improved form from which the completed packing-case filler flats are parted by successive slitting and cutting-off operations.

Another object of invention is to provide improved mechanism for assembling and arranging the completed articles in convenient order for handling.

Another object of invention is to provide suitable mechanism for separately corrugating the several ribbons in a peculiar order to facilitate the subsequent parting of the composite structure to form the individual packing-case filler blanks.

Other specific objects of invention will appear in the specification in connection with the appended claims.

The drawings exemplify my invention in a preferred embodiment.

In the drawings

Figures 1 and 1ª show a side elevation of a preferred embodiment of my invention.

Figure 2 is a rear end elevation of the same on an enlarged scale, parts being broken away.

Figure 3 is a vertical longitudinal section of the rear portion of the machine on an enlarged scale.

Figure 4 is a vertical section of the central longitudinal portion of the machine on an enlarged scale.

Figure 5 is an enlarged vertical transverse section on the line 5—5 of Figure 1.

Figure 6 is an elevation of a portion of the fountain roll for applying glue to the corrugated ribbons preliminary to their attachment to the common continuous web.

Figure 7 is a vertical transverse section on an enlarged scale corresponding to the line 7—7 of Figure 4.

Figure 8 is an enlarged vertical transverse section corresponding to the line 8—8 of Figure 4.

Figure 9 is an enlarged vertical transverse section corresponding to the line 9—9 of Figure 4.

The present invention contemplates more especially that type of packing case employed for the shipment of eggs. The term "egg-case filler flats" as employed in this specification, however, is intended to include packing-case filler flats for any fragile articles that are peculiarly susceptible to breakage when subjected to sudden jars or shocks.

Ribbon-feed mechanism.

Figure 1:
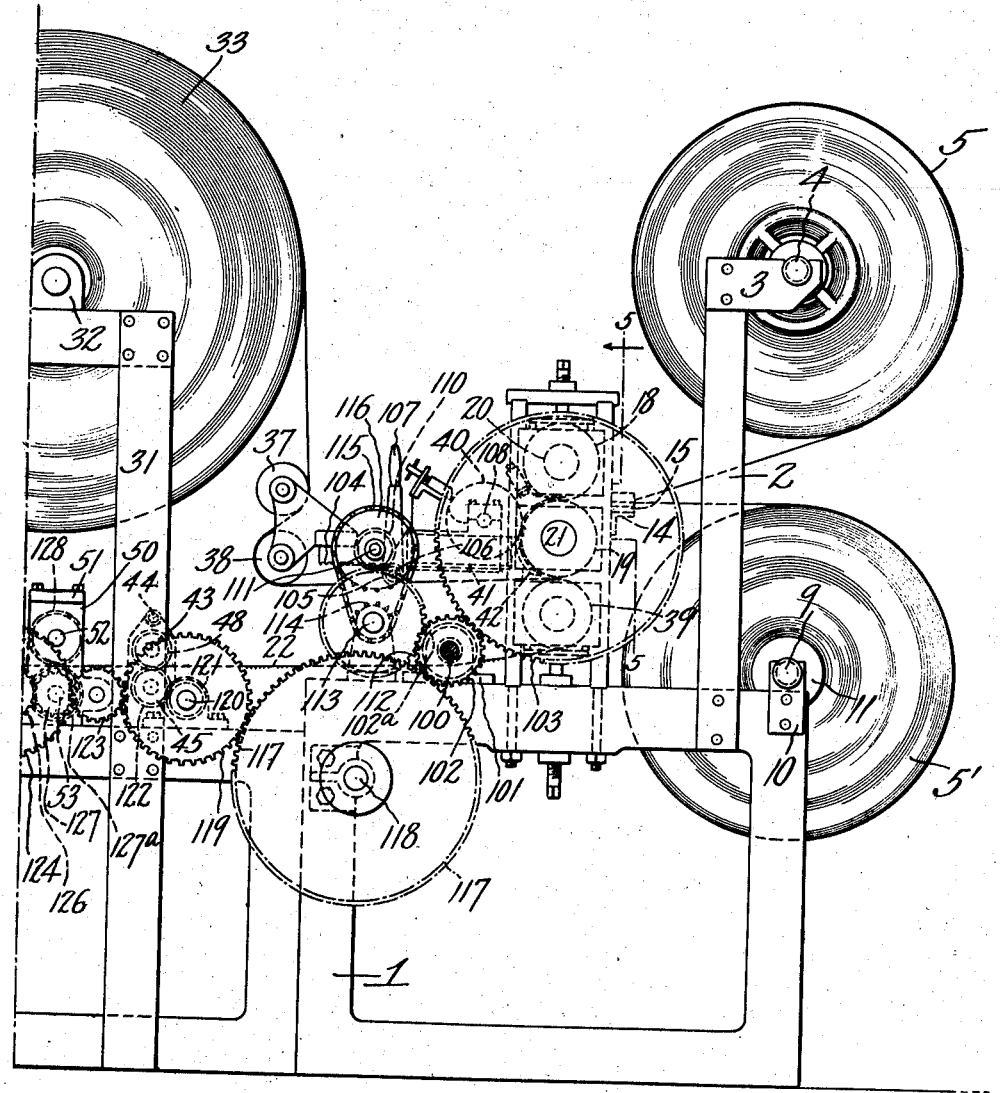

As shown in Figures 1, 1ª, and 2, the side frames 1 of the machine serve to mount laterally spaced standards 2. Mounted in rearwardly presented bracket-arms 3 at the upper ends of standards 2, is an arbor 4, said arbor providing a journalling support for a plurality of laterally-spaced rolls 5 of ribbons. A collar or abutment 6, which may be locked against axial displacement at various points along the arbor 4, serves to position the rolls 5 under the axial pressure exerted by a movable collar 7 under the pressure of a spring 8. A lower arbor 9 is mounted in suitable bracket supports 10 on opposite side frames 1 of the machine, and carries a plurality of rolls 5' which are interposed between an adjustably set collar 11 and a movable collar 12 acted upon by a compression spring 13. By an inspection of Figure 2, it will be seen that the lower ribbons or rolls 5' are staggered with respect to the upper ribbons or rolls 5, this arrangement making it possible to economize space and to feed a relatively large number of ribbons to the corrugating rolls to be presently referred to. An angle bar 14 which extends between the side frames of the machine, serves to support a transverse guidebar 15 provided with a series of laterally-spaced guides 16 for guiding the several ribbons to the respective sections of the corrugating rolls which are to operate thereon. Within each of said guides 16 is a gravity actuated pawl or finger 17 which depresses each of the upper ribbons 5 into the horizontal plane in which the upper and lower ribbons move as they pass between cooperating pairs of corrugating rolls 18 and 19.

Corrugating rolls.

As shown in Figure 3, the corrugating rolls 18 and 19 are mounted upon upper and lower transverse shafts 20 and 21, said shafts being journalled in the side frames of the machine and driven by any suitable power connections. As shown best in Figure 5 of the drawings, the corrugated rolls 18 and 19 are formed with axially-spaced peripheral sections by means of peripheral grooves 18ª and 19ª. Furthermore, according to the preferred embodiment of my invention shown on the drawings, the corrugated sections of upper roll 18 are axially offset from the corrugated sections of lower roll 19. Each of the rolls 18 and 19 is provided with a peculiar peripheral arrangement of corrugations which can be more readily understood after a brief description of one of the egg-case filler flats has been given in connection with a description of the built-up structure of which it constitutes a separated portion.

Continuous web and corrugated ribbon structure.

Figure 10:
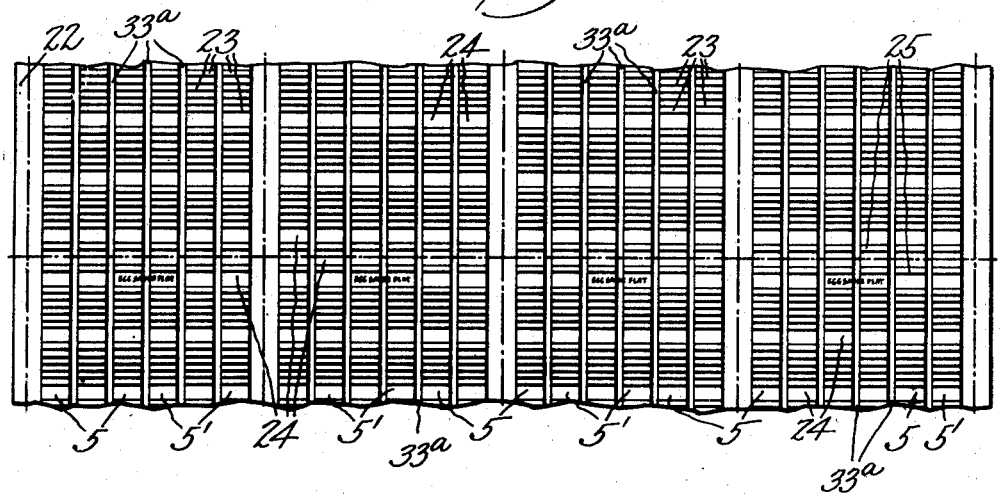
Figure 10 is a fragmentary plan view of the web and corrugated ribbon structure with the slitting and cutting-off lines indicated thereon.
Figure 11:
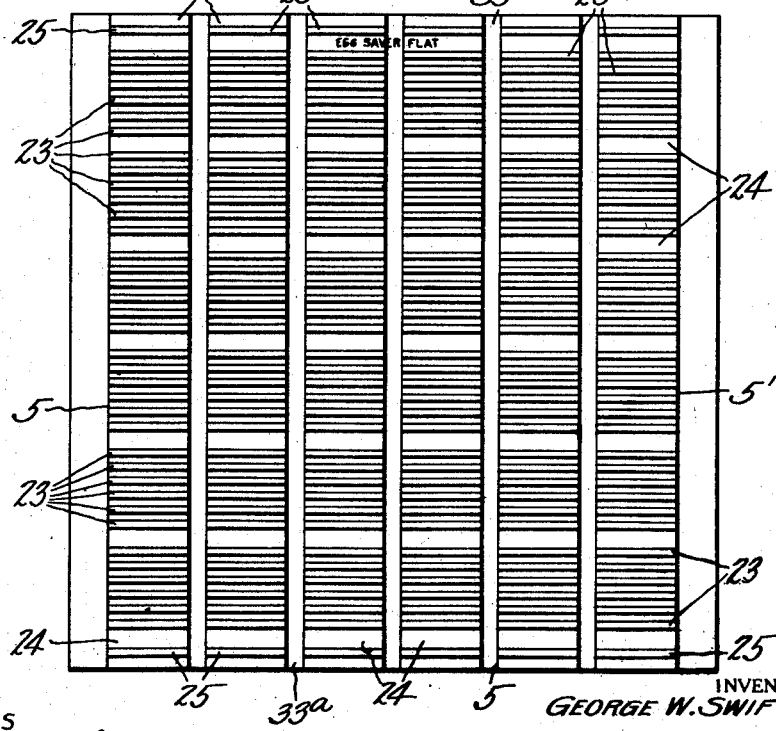
Figure 11 is a plan view of one of the completed packing-case filler flats.

By an inspection of Figure 10, it will be understood that the built-up structure comprises a continuous base web or liner sheet 22 to which has been attached continuous laterally-spaced corrugated ribbons 5, 5'. It will be seen that each of the ribbons 5, 5' is provided with transverse corrugations arranged in recurring series of groups. According to the present embodiment of my invention, there are six groups of corrugations 23 arranged six in a group with flat spaces 24 interposed between the adjacent groups. Interposed in series between each of said six groups of corrugations and the next similar series of similar groups, are two separate corrugations 25 separated from each other and from the groups of corrugations 23 which precede and follow them by flat spaces 24. In order to supply laterally-spaced ribbons provided with corrugations according to the above-described plan, the corrugating rolls 18 and 19 are provided with suitable cooperating peripheries such that each rotation of said corrugating rolls produces two sets of six groups having six corrugations in each group and with said sets separated from each other in series by two spaced separate corrugations. Thus, upper corrugating roll 18 is provided with a plurality of groups of teeth 27 of relatively small circumferential pitch, each of said groups being separated from the next group by a relatively broad space 28 formed by the omission of one of said teeth. At diametrically opposite points, the corrugating roll 18 is provided with two segregated teeth 27' separated from each other and from the adjacent groups of teeth 27 by broad spaces 28'. The lower corrugating roll 19 is provided with similarly arranged groups of small teeth 29 which intermesh with the teeth 27 in upper corrugating roll 18 and with relatively broad-faced teeth 30 which mesh into the broad spaces 28' between the teeth 27, 27' of roll 18. It will be understood from this description that each continuous ribbon passing between the upper and lower corrugating rolls 18 and 19 will thus be provided with successive groups of corrugations as described above.

Web-feeding and ribbon-attaching mechanism.

Referring now to Figures 1, 1ª, and 3, the side frames 1 are provided with upwardly-presented extensions 31 which carry axially-spaced bearings 32 for a base-web roll 33 and other axially-spaced bearings 34 for a shaft 35 which carries a reserve roll 36 of the base web. According to Figure 1, the continuous base web 22 passes around suitable guide rollers 37 and 38 and from the latter to an impression roll 39 which as shown best in Figure 3 is cooperatively disposed with respect to the lower corrugating roll 19. As the web 22 passes between impression roll 39 and lower corrugating roll 19, the laterally-spaced corrugated ribbons 5, 5', are firmly pressed against the web 22 in such a way as to securely attach said ribbons to the web by the aid of a suitable adhesive previously applied to the crown surfaces of the corrugations formed in the several ribbons as well as to the interposed flat surfaces referred to above. Suitable means for applying adhesive to the corrugated ribbons, may be provided in the form of a fountain roll 40 operating in a trough or fountain 41 and having its peripheral surface in running contact with the crowns of said corrugations as the ribbons pass between the fountain roll 40 and lower corrugated roll 19. As shown in Figure 6 of the drawings, the fountain roll 40 is provided with axially-spaced peripheral grooves 40ª which in effect form a corresponding number of glue-applying belts extending around said fountain roll. Extending part-way around the lower corrugated roll 19 and between it and the fountain roll 40 are a plurality of axially-spaced guards or fingers 42. These guards or fingers are arranged respectively in the peripheral grooves 40ª and project upwardly around the lower corrugated roll 19 and into the axially-spaced peripheral grooves in the upper corrugated roll 18. In this way, the corrugated ribbons are retained on the periphery of lower corrugated roll 19 until they are made to adhere to the base-web 22. From the common vertical plane which includes the rotary axes of rolls 18, 19, and 39, the continuous composite band including base-web 22 and corrugated ribbons 5 and 5' attached thereto, pass downwardly around the impression roll 39 and forwardly to a printing mechanism which is now to be described. As indicated in Figure 2, the upper and lower corrugating rolls 18 and 19 as well as pressure roll 39, may be heated by steam conveyed thereto by means of piping connections 20ª, 21ª, and 39ª connected to these parts respectively.

Web-printing mechanism.

This device is shown in Figures 4 and 7. Mounted upon the side frames 1 of the machine are laterally-spaced standards 43 which are connected at the top by a transverse tie-rod 44. Journaled in the standards 43 on the under side of the plane of feed is a printing roll 45, said printing roll being provided with a number of angular recesses 46 at intervals along the axis of said printing roll. Mounted within each of said angular recesses is a type-bar 47 which is adapted to stamp a legend upon the flat surfaces 24 between successive groups of corrugations formed in the continuous ribbons. Arranged above the plane of feed and also journaled in the standards 43 is an impression roll 48 which carries a platen bar 49 embedded in the periphery of impression roll 48 and adapted periodically to cooperate with the type-bar 47 for stamping the legends above referred to.

Slitting cutters.

As shown in Figures 4 and 8, the composite band is next parted longitudinally in preparation for a transverse cutting-off operation by means of which the egg-case filler flats are brought to their finished form as hereinafter described. For this purpose, laterally-spaced uprights 50 may be mounted on side frames 1, said uprights being connected above by a cross-beam 51. Journaled in the uprights 50 are upper and lower slitter-shafts 52 and 53. Secured to said shafts adjacent opposite ends thereof are cooperating cutter disks 54 and 55 for trimming the lateral edges of the base web 22, said cutter disks being respectively secured to the upper and lower slitter shafts by means of set screws 56. Secured to said cutter shafts at suitable transversely-spaced intervals are cooperating pairs of slitter-disks 57 and 58. Arranged between each pair of slitter-disks and the next, and between each pair of lateral-edge trimming cutters and the slitter-disks next adjacent thereto are friction-driven feed rolls 59 and 60, the upper feed rolls 59 being provided with relatively broad contact faces adapted to engage the upwardly-presented plane surfaces of the base-web 22 and the lower feed rolls 60 being provided with relatively narrow contact faces adapted to engage the under surface of the base-web along the narrow corridors 33ª extending between the laterally-spaced corrugated ribbons carried by said base-web. Adjacent to each pair of splitter-disks 57, 58, are upper and lower guide rollers 61 and 62 which are provided with broad faces as shown best in Figure 8, for preventing upward or downward displacement of the longitudinally parted sections of the composite structure under the pressure of said slitter-disks. These guide rollers are provided with hub-portions 63 and 64 which are secured to the upper and lower slitter-shafts by means of set-screws 56. The feed-rolls 59 and 60 are preferably driven by friction and for this purpose each of said feed-rolls is freely journaled and supported against axial displacement on its shaft by means of a disk 65 provided with a hub 66 which is secured to the shaft by a set screw 67. Interposed between the disk 65 and the feed roll, is a friction disk 68. A similar friction disk 69 is interposed between the opposite face of the feed roll and a pressure disk 70 which is pressed against it under the action of a compression spring 71 which is axially confined between said pressure disk and a fixed collar 72 which is secured to the shaft by a set screw 56.

Transverse cutters.

A short distance in advance of the slitter-cutters and mounted upon the side frames 1 of the machine, are oppositely disposed uprights 73 which are connected above by a cross-piece 74. Journaled within said uprights, are an upper cutter shaft 75 and a lower cutter shaft 76. Each of said shafts is provided with a spirally formed peripheral recess which extends longitudinally of the shaft and serves to accommodate a spiral cutter bar 77. Said cutter bars cooperate with each other for producing a shearing cut from one side to the other across the several longitudinal sections of the composite web structure and thus serve to cut therefrom successive groups of egg-case filler flats which are then ready to be discharged from the machine. For the sake of convenience in handling the finished egg-case filler flats, the present invention contemplates means for arranging them in pairs with the flat surfaces together.

Inverting and pairing mechanism.

Keyed to a rotary shaft 78 shown in Figures 4 and 9 of the drawings are a plurality of pairs of lower feed delivery rolls 79. The rolls of each of said pairs are so disposed as to engage the outer side edges of the base web portion of successive egg-case filler flats delivered thereto, the laterally-spaced corrugated ribbons on said egg-case filler flats being presented downwardly in the space between said feed rolls. Said shaft 78 is journalled in uprights 80 arranged opposite to each other on the side frames 1, said uprights being connected above by a transverse bar 81. Cooperating with the lower feed delivery rolls 79 are upper delivery feed rollers 82 which are keyed to an upper rotary shaft 83. Suitable means for supporting the upper delivery shaft 83 against upward displacement may be provided in the form of inverted bearing blocks 84 which are secured above to the transverse bar 81 and provided below with part-circular bearings 85. Arranged between the lower cutter shaft 78 and lower feed delivery rolls 79 is a bridging plate 86 which is inclined upwardly and forwardly and deflected downwardly along its rear edge. Said bridging plate is carried by posts 87 which project upwardly from the side frames 1. Keyed to rotary shaft 78 between each pair of lower delivery feed rolls 79, are laterally-spaced turning disks 88 which are arranged and adapted to invert every other one of the completed egg-case filler flats in each series. Secured to the outer periphery of each of the turning disks 88 is a rearwardly presented guard or finger 89, the alined guards or fingers on each pair of turning disks being arranged to intercept the forward edge of every alternate egg-case filler flat which is thereby forced to remain in close juxtaposition to the peripheries of lower feed rolls 79 and turning disks 88 until said forward edge is in turn intercepted by laterally-spaced fixed stops 90 which project across the path of said forward edge. As a result, the filler flat is caused to swing about its forward edge and to fall in an inverted position upon the previously delivered unturned filler-flat. According to the present embodiment of my invention, the lower delivery feed rolls and turning disks are made of sufficient size to rotate once while two successive egg-case filler flats are being delivered. It will be understood therefore that each alternate sheet is delivered flatwise with the corrugated ribbons presented upwardly while every other filler flat will be inverted and fall upon the former with its corrugated ribbons presented downwardly, the filler flats being thus paired in their relative positions most convenient to be handled in placing them in the crates for which they are intended.

Delivery conveyor.

As shown in Figures 1ª and 4, a delivery feed table 91 extends forwardly from and below the delivery feed rolls. Journaled in the side frames 1 to the rear of delivery feed board 91 is a belt-supporting roller 92. At the forward edge of said feed board and journaled in extensions to the side frames 1, is a second belt-supporting roller 93. Running around said rollers 92 and 93 and over the delivery feed table 91, are a plurality of conveyor belts 94 which are adapted by periodic movements imparted thereto to convey the completed egg-case filler blanks from the delivery feed rolls above referred to.

Power transmission.

Referring now to Figure 1, a main power-driven shaft 100 is journaled in suitable bearing brackets 101 mounted on the side frames 1. Keyed to the shaft 100 is a spur pinion 102 which meshes into a large gear 103 which is keyed to the shaft 21 which carries the lower corrugated roll 19 and transmits power to the upper corrugated roll 18. It will be understood from the foregoing description that the upper and lower corrugating rolls 18 and 19, pressure roll 39, and fountain roll 40 are all rotatable in unison. As shown best in Figure 3, the fountain or trough 41 which holds the adhesive, is movable longitudinally to throw the fountain roll 40 into and out of position to apply adhesive to the corrugated ribbons. For this purpose, a rack bar 104 may be secured to the bottom of fountain 41. Meshing into rack-bar 104 is a spur-pinion 105 keyed to an oscillatory shaft 106 which carries a hand-lever 107. By moving said hand-lever 107 through an arc of approximately 180 degrees, the fountain 41 and fountain roll 40 may be moved from the position shown in Figure 3 to a position distant therefrom. The fountain roll 40 is carried by a shaft 108 which is journaled in suitable bearings on the fountain frame. Keyed to shaft 108 is a large spur gear 109 which, in the said distant position of the fountain roll 40, meshes with a slowly moving spur gear 110 keyed to a shaft 111. Suitable connections for imparting a slow rotary movement to the shaft 111, may be provided as follows. Keyed to the shaft 100 which carries the gear 102, is a spur pinion 102ª which, as shown in Figure 1, is in mesh with a spur gear 112, said gear 112 being keyed to a shaft 113. Also keyed to the shaft 113, is a sprocket pinion 114 which drives a sprocket chain 115, said sprocket chain being connected above to a sprocket wheel 116 which is keyed to the shaft 111. It will be seen, therefore, that if, for any reason, the fountain roll has been retracted from its adhesive-applying position, its rotary movement may be continued for the purpose of preventing the adhesive becoming dried on exposed portions of the fountain roll 40 should said roll be brought to rest for any considerable length of time.

Referring now to Figures 1 and 1ª, the spur pinion 102 drives a large spur gear 117 on a shaft 118, said gear 117 being in mesh with a spur gear 119 keyed to a shaft 120. A small pinion 121 which is also keyed to the shaft 120, meshes with a small gear 122 which is keyed to the shaft upon which the printing roll 45 is mounted. Meshing with the spur gear 119 and driven thereby is an idler gear 123 which transmits power to a large spur gear 124 on a shaft 125. Rotating with the spur gear 124 is another spur gear 126 which meshes with and drives a spur gear 127 keyed to the lower slitter shaft 53. Keyed to the shaft 53, is a spur pinion 127ª which drives a spur gear 128 carried by the upper slitter shaft 52. The spur gear 126 also drives a spur gear 129 on the lower cutter shaft 76 which meshes with a spur gear 130 carried by the upper cutter shaft 75. Keyed to the other ends of lower and upper cutter shafts 76 and 75, are intermeshing gears 129ª and 130ª (see Figure 4). Gear 129ª drives an idler 131 which meshes with a gear 132 on the lower delivery feed shaft 78, a spur gear 133 being in mesh with spur gear 132 for driving the upper delivery feed shaft 83. As shown in Figures 1ª, 4, and 9, a connecting rod 134 has one end pivotally mounted on a stud 135 which projects laterally from the spur gear 132, said stud being provided with a T-shaped head 136 to adapt it to be slidably adjusted in a T-shaped slot 137 and radially with respect to the axis of lower delivery feed shaft 78. By adjusting said T-head stud to different positions along said slot, the throw imparted to said connecting rod, may be regulated at will. The forward end of connecting rod 134 is pivotally mounted upon a stud 138 which is carried in the outer end of a ratchet lever 139 pivotally mounted upon the forward conveyor shaft 140 to which is keyed a ratchet 141. Said ratchet lever 139 carries a pawl 142 which is pivoted upon said stud 138 and operates on the ratchet 141 for imparting periodic movements thereto.

I claim:—

1. A machine for making egg-case filler flats, said machine comprising means for forming each of a plurality of ribbons with transverse corrugations, and means for securing said corrugated ribbons to a flat web or base in laterally-spaced order.

2. A machine for making egg-case filler flats, which machine comprises means for feeding a continuous web or base, means for superimposing thereon and securing thereto in laterally-spaced order a plurality of corrugated ribbons, and means for cutting from the resulting structure successive portions thereof.

3. A machine for making egg-case filler flats, which machine comprises mechanism for applying to a continuously moving web a plurality of laterally-spaced corrugated ribbons, means for slitting said continuously moving web longitudinally between adjacent corrugated ribbons, and means for severing successive portions from the longitudinally parted sections.

4. A machine for making egg-case filler flats, which machine comprises mechanism for separately forming a plurality of corrugated ribbons, mechanism for attaching said corrugated ribbons in laterally-spaced parallel arrangement to a flat web or base, mechanism for separating said flat web or base into longitudinally parted sections each having a plurality of parallelly arranged corrugated ribbons attached thereto, and mechanism for cutting off successive portions of said longitudinally divided sections to form the egg-case filler flats.

5. A machine for making egg-case filler flats, which machine comprises mechanism for supplying a continuous web, a plurality of corrugating rolls, mechanism for passing a plurality of separate ribbons through said corrugating rolls, mechanism for continuously attaching the corrugated ribbons to said continuous web, mechanism for longitudinally slitting said continuous web, and mechanism for severing successive portions from the parted sections of said web with superposed corrugated ribbons to form egg-case filler flats.

6. A machine for making egg-case filler flats, which machine comprises an impression roll, means for supplying a continuous flat web to said impression roll, mechanism for separately corrugating a plurality of ribbons, mechanism for superimposing said corrugated ribbons in laterally-spaced arrangement upon said continuous flat web and attaching them thereto while said flat web is passing over said impression roll, mechanism for parting said flat web longitudinally between adjacently-disposed corrugated ribbons, and mechanism for cutting off successive portions of the longitudinally parted sections of said web and corrugated ribbons to form the egg-case filler flats.

7. A machine for making egg-case filler flats, said machine comprising cooperating corrugated rolls, one of said rolls being constructed with axially-spaced peripheral sections, means for supplying a ribbon to each of said peripheral portions, a fountain roll arranged to apply adhesive to the crowns of the corrugations imparted to said ribbons by said corrugating rolls, an impression roll arranged to press a continuous flat web against said crowns of the corrugations in all of said ribbons, means for supplying a continuous flat web to said impression roll between it and the corrugated ribbons, and means for separating the composite structure into sections to form egg-case filler flats.

8. In a machine for making egg-case filler flats, the combination with cooperating corrugating rolls, of a roll-supporting arbor, a plurality of laterally-spaced ribbon-roll supports mounted on said arbor, means for guiding said ribbons in laterally-spaced arrangement to said corrugating rolls, means for applying adhesive to the crowns of the corrugations formed by said rolls in all of said ribbons, an impression roll cooperatively arranged with respect to one of said corrugating rolls about which the corrugated ribbons are passed, and means for feeding a flat web over said impression roll and between it and said corrugated ribbons, said cooperatively arranged corrugated and impression rolls being adapted to attach the adhesive-carrying crowns to said flat web.

9. In a machine for making egg-case filler flats, the combination with corrugating rolls cooperatively arranged with respect to each other, said corrugating rolls being provided with peripherally-spaced groups of ribbon-corrugating teeth, of a plurality of ribbon rolls arranged to deliver laterally-spaced ribbons to said rolls, means for supplying a common base-web to all of the laterally-spaced corrugated ribbons, and means for attaching said corrugated ribbons to said common base-web.

10. In a machine for making egg-case filler flats, the combination with cooperating corrugating rolls, of roll-supporting arbors arranged on opposite sides of a plane in which said corrugating rolls coact, a plurality of laterally-spaced rolls of ribbons mounted on each arbor, the rolls on one of said arbors being staggered with respect to the rolls on the other of said arbors, a guide bar provided with openings respectively adapted and arranged to guide said ribbons between said corrugating rolls, an impression roll between which and one of said corrugating rolls the corrugated ribbons are passed, means for supplying a flat web to said impression roll and between it and the corrugating roll last referred to, and means for applying adhesive to said corrugated ribbons, the crowns of the corrugations on all of said ribbons being secured to said web by means of said impression roll.

11. In a machine for making egg-case filler flats, the combination with corrugating rolls cooperatively arranged with respect to each other, of means for delivering parallel ribbons to and between said corrugating rolls, means for supplying a base-web common to all of the laterally-spaced corrugated ribbons, means for attaching all of said corrugated ribbons to said common base web, means for parting said base web longitudinally, means for cutting off successive portions of the parted sections to form the egg-case fillers, and means for inverting every other one of the egg-case fillers cut from each of said longitudinal sections.

12. In a machine for making egg-case filler flats, the combination with cooperating corrugating rolls, of roll-supporting arbors arranged on opposite sides of a plane in which said corrugating rolls coact, a plurality of laterally-spaced rolls of ribbons mounted on each arbor, the rolls on one of said arbors being staggered with respect to the rolls on the other of said arbors, a guide bar provided with openings respectively adapted and arranged to guide said ribbons into position to be operated upon by said corrugating rolls, means for applying adhesive to the crowns of the corrugations on all of said ribbons, means for supplying a main base web, and means for applying the laterally-spaced parallelly arranged corrugated ribbons to said base web.

13. In a machine for making egg-case filler flats, the combination with corrugating rolls cooperatively arranged with respect to each other, said corrugating rolls being provided with peripherally-spaced groups of transversely arranged projections for imparting groups of corrugations to said ribbons with intervening flat spaces between said groups, of a plurality of ribbon rolls arranged to deliver laterally-spaced ribbons to said rolls, a fountain roll for applying adhesive to said ribbons as they pass around one of said corrugating rolls, means for supplying a base-web common to all of the laterally-spaced corrugated ribbons, and an impression roll cooperatively arranged with respect to the last-mentioned corrugating roll for pressing said corrugated ribbons against said common base-web.

14. In a machine for making egg-case filler flats, the combination of an upper corrugating roll provided with peripheral grooves forming axially-separated corrugated sections, a lower corrugating roll provided with peripheral grooves forming axially-separated corrugated sections intermeshing with the corrugated sections of the upper roll, means for delivering a ribbon to each section of the lower corrugated roll and between said corrugating rolls, means for delivering a web into position to be attached to all of said ribbons in common, means for securing said ribbons to said common web, and means for parting the composite structure thus produced into sections.

15. In a machine for making egg-case filler flats, the combination of an upper corrugating roll provided with peripheral grooves forming axially-separated corrugated sections, a lower corrugating roll provided with peripheral grooves forming axially-separated corrugated sections intermeshing with the corrugated sections of the upper roll, an impression roll, means for delivering a ribbon to each section of the lower corrugated roll, said ribbons passing between said corrugating rolls and between the lower corrugating roll and said impression roll, means for applying adhesive to the corrugated ribbons, means for delivering a web to said impression roll, said web being common to all of said ribbons and adapted to be attached to said ribbons by means of the interposed adhesive, and means for parting the composite structure thus produced into sections.

16. In a machine for making egg-case filler flats, the combination of an upper corrugating roll provided with peripheral grooves forming axially-separated corrugated sections, a lower corrugating roll provided with peripheral grooves forming axially-separated corrugated sections off-set with respect to the corrugated sections of the upper roll, finger guards extending around the peripheral sections of the lower corrugating roll and into the peripheral grooves of the upper corrugating roll, an impression roll disposed below the lower corrugating roll, means for delivering a ribbon to each section of the lower corrugated roll, said ribbons passing between said corrugating rolls around the lower corrugating roll and between the latter and said impression roll, means for delivering a web to said impression roll, said web being common to all of said ribbons, a fountain roll for adhesive operating upon the corrugated ribbons as they pass around the lower corrugated roll, said impression roll being adapted to attach said ribbons to said common web by the aid of an interposed adhesive, and means for parting the composite structure thus produced into sections.

17. In a machine for making egg-case filler flats, the combination of an upper corrugating roll provided with peripheral grooves forming axially-separated corrugated sections, a lower corrugating roll provided with peripheral grooves forming axially-separated corrugated sections offset with respect to the corrugated sections of the upper roll, an impression roll disposed below the lower corrugating roll, means for delivering a ribbon to each section of the lower corrugated roll, said ribbons passing between said corrugating rolls around the lower corrugating roll and between the latter and said impression roll, means for applying adhesive to said corrugated ribbons, means for delivering a web to said impression roll, said web being common to all of said ribbons, said impression roll being adapted to attach said ribbons to said common web by the aid of an interposed adhesive, finger guards extending around the peripheral sections of the lower corrugating roll and into the peripheral grooves of the upper corrugating roll, and means for parting the composite structure thus produced into sections.

18. In a machine for making egg case filler flats, the combination with mechanism for feeding a continuous web or base, of means for superimposing thereon and securing thereto in laterally spaced order a plurality of corrugated ribbons.

GEORGE W. SWIFT, JR.